United States Patent
Tsunashima et al.

(10) Patent No.: US 8,216,066 B2
(45) Date of Patent: Jul. 10, 2012

(54) GAME DEVICE, GAME DEVICE CONTROL METHOD, PROGRAM, AND INFORMATION STORAGE MEDIUM

(75) Inventors: Tadaaki Tsunashima, Fujisawa (JP); Hideki Yanagihara, Nerima-ku (JP)

(73) Assignee: Konami Digital Entertainment Co., Ltd., Tokyo (JP)

(*) Notice: Subject to any disclaimer, the term of this patent is extended or adjusted under 35 U.S.C. 154(b) by 291 days.

(21) Appl. No.: 12/602,938

(22) PCT Filed: Feb. 5, 2008

(86) PCT No.: PCT/JP2008/051819
§ 371 (c)(1),
(2), (4) Date: Dec. 3, 2009

(87) PCT Pub. No.: WO2008/149575
PCT Pub. Date: Dec. 11, 2008

(65) Prior Publication Data
US 2010/0240453 A1 Sep. 23, 2010

(30) Foreign Application Priority Data
Jun. 4, 2007 (JP) ................................. 2007-148665

(51) Int. Cl.
*G06F 17/00* (2006.01)
(52) U.S. Cl. ........................................................ 463/30
(58) Field of Classification Search .............. 463/29–34, 463/43, 44; 345/418, 419
See application file for complete search history.

(56) References Cited

U.S. PATENT DOCUMENTS

| 6,949,024 | B2* | 9/2005 | Kaku et al. ...................... 463/31 |
| 7,706,636 | B2* | 4/2010 | Higashino et al. ............ 382/302 |
| 2002/0109680 | A1* | 8/2002 | Orbanes et al. ............... 345/418 |
| 2006/0217008 | A1* | 9/2006 | Higashino et al. ............ 439/894 |
| 2009/0244309 | A1* | 10/2009 | Maison et al. ............. 348/222.1 |

FOREIGN PATENT DOCUMENTS

JP 2005-099952 A 4/2005
JP 2005-342120 A 12/2005

OTHER PUBLICATIONS

E Kamutonaorusutazu, Play wa do Kawatta noka?, Konami Kanpeki Koryaku Series 92, World Soccer Winning Eleven 6 Final Evolution Master League Kyukyoku Bible, 1st edition, Konami Co., Ltd., Jan. 25, 2003, p. 8, STEP1 Uniform o Hipparu.

* cited by examiner

*Primary Examiner* — Ronald Laneau
(74) *Attorney, Agent, or Firm* — Sughrue Mion, PLLC

(57) ABSTRACT

To provide a game device capable of expressing, through a relatively simple process, a picture showing a first character object grabbing and pulling a clothing object of a second character object. According to the present invention, a direction from the position of the second character object to the position of the first character object is obtained, and based on the obtained direction, the positions of at least some of the vertexes of the clothing object are changed (S205). Further, the position of a predetermined portion of the first character object, which is used to pull the clothing object, is changed, based on the obtained direction (S206).

9 Claims, 16 Drawing Sheets

$((10-m+1)/10)*\Delta P2$
74o-m •------------>•—74-m

⋮

74o-9 •---->•— 74-9

74o-10 •>•— 74-10

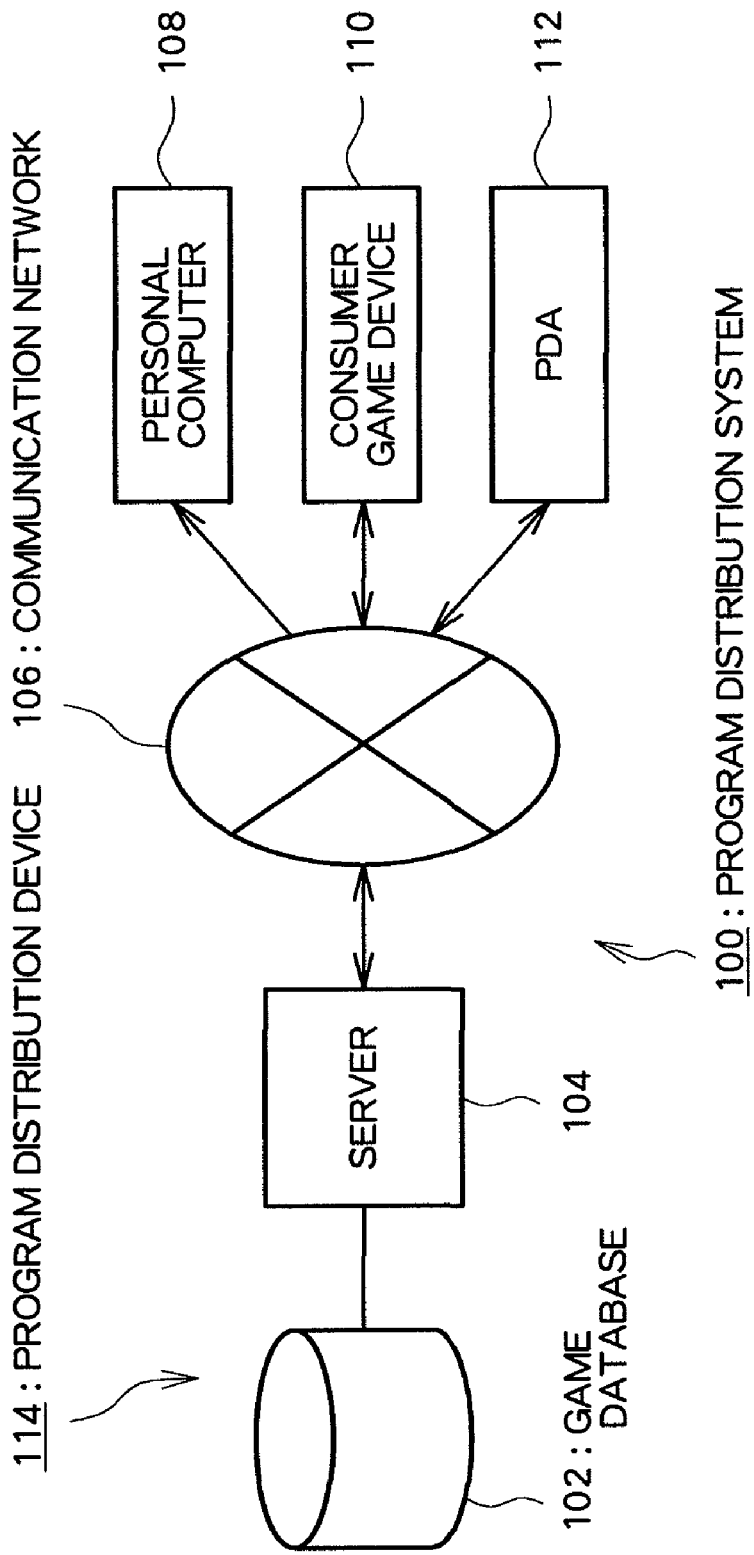

GAME DEVICE, GAME DEVICE CONTROL METHOD, PROGRAM, AND INFORMATION STORAGE MEDIUM

TECHNICAL FIELD

The present invention relates to a game device, a game device control method, a program, and an information storage medium.

BACKGROUND ART

There is known a game device for displaying a game screen image showing a picture obtained by viewing a virtual three dimensional space from a given viewpoint. For example, there is known a game device for displaying a game screen image showing a picture obtained by viewing from a given viewpoint a virtual three dimensional space where a plurality of player objects representative of soccer players are placed, to thereby provide a soccer game.
Patent Document 1: JP 2005-342120 A

DISCLOSURE OF INVENTION

Problems to be Solved by the Invention

Here, in an actual soccer game, or the like, a player may grab and pull the uniform of another player to block the other player from playing. Therefore, for example, if a picture showing a player object grabbing and pulling the uniform of another player object can be displayed in the above-described soccer game, the reality of the soccer game can be enhanced. In displaying such a picture showing a player object grabbing and pulling the uniform of another player object, it is necessary to avoid a heavy processing load.

The present invention has been conceived in view of the above, and an object thereof is to provide a game device, a game device control method, a program, and an information storage medium capable of expressing, through a relatively simple process, a picture showing a first character object grabbing and pulling a clothing object of a second character object.

Means for Solving the Problems

In order to attain the above described object, a game device according to the present invention is a game device for displaying a picture showing a first character object pulling a clothing object included in a second character object, in which the first character object and the second character object are placed in a virtual three dimensional space, comprising direction obtaining means for obtaining a direction from a position of the second character object to a position of the first character object; clothing object control means for changing positions of at least some of vertexes of the clothing object, based on the direction obtained by the direction obtaining means; and first character object control means for changing a position of a predetermined portion of the first character object, based on the direction obtained by the direction obtaining means, the predetermined portion being used to pull the clothing object.

Also, a game device control method according to the present invention is a control method for controlling a game device for displaying a picture showing a first character object pulling a clothing object included in a second character object, in which the first character object and the second character object are placed in a virtual three dimensional space, the method comprising a direction obtaining step of obtaining a direction from a position of the second character object to a position of the first character object; a clothing object control step of changing positions of at least some of vertexes of the clothing object, based on the direction obtained at the direction obtaining step; and a first character object control step of changing a position of a predetermined portion of the first character object, based on the direction obtained at the direction obtaining step, the predetermined portion being used to pull the clothing object.

Also, a program according to the present invention is a program for causing a computer, such as, e.g., a consumer game device, a portable game device, a portable phone, a personal digital assistant (PDA), a personal computer, or the like, to function as a game device for displaying a picture showing a first character object pulling a clothing object included in a second character object, in which the first character object and the second character object are placed in a virtual three dimensional space, the program for causing the computer to function as direction obtaining means for obtaining a direction from a position of the second character object to a position of the first character object; clothing object control means for changing positions of at least some of vertexes of the clothing object, based on the direction obtained by the direction obtaining means; and first character object control means for changing a position of a predetermined portion of the first character object, based on the direction obtained by the direction obtaining means, the predetermined portion being used to pull the clothing object.

Also, an information storage medium according to the present invention is a computer readable information storage medium storing the above described program. A program distribution device according to the present invention has an information storage medium recording the above described program, and reads the above described program from the information storage medium and distributes the read program. A program distribution method according to the present invention is a program distribution method for reading the above described program from an information storage medium recording the above described program and distributing the read program.

The present invention relates to a game device for displaying a picture showing a first character object pulling the clothing object included in a second character object, in which the first character object and the second character object are placed in a virtual three dimensional space. According to the present invention, a direction from the position of the second character object to the position of the first character object is obtained, and based on the obtained direction, the positions of at least some of the vertexes of the clothing object are changed. Further, based on the obtained direction, the position of a predetermined portion of the first character object, the portion being used to pull the clothing object, is changed. According to the present invention, it is possible to express, through a relatively simple process, a picture showing the first character object grabbing and pulling the clothing object of the second character object.

Also, according to one aspect of the present invention, the at least some of the vertexes of the clothing object may move according to a reference point set in the virtual three dimensional space, and the clothing object control means may change the position of the reference point, based on the direction obtained by the direction obtaining means.

Also, according to one aspect of the present invention, the first character object control means may change the position of the predetermined portion, based on the positions of the at least some of the vertexes of the clothing object.

Also, according to one aspect of the present invention, the above described game device may further comprise distance obtaining means for obtaining a distance between the position of the second character object and the position of the first character object, wherein the clothing object control means may change the positions of the at least some of the vertexes of the clothing object, based on the direction obtained by the direction obtaining means and the distance obtained by the distance obtaining means.

Also, according to one aspect of the present invention, the clothing object control means may change the positions of the at least some of the vertexes of the clothing object, based on the direction obtained by the direction obtaining means and a distance obtained by multiplying the distance obtained by the distance obtaining means by a factor, and the clothing object control means may include means for changing the factor as time passes.

Also, according to one aspect of the present invention, the above described game device may further comprise motion data storage means for storing motion data describing a basic motion of the predetermined portion in a case where the first character object pulls the clothing object, and predetermined portion position obtaining means for obtaining the position of the predetermined portion of the first character object, the position being specified based on the motion data, wherein the distance obtaining means may obtain the distance between the position of the second character object and the position of the predetermined portion of the first character object.

Also, according to one aspect of the present invention, the direction obtaining means may obtain the direction from the position of the second character object to the position of the predetermined portion of the first character object.

BRIEF DESCRIPTION OF THE DRAWINGS

FIG. 11 is a diagram explaining another method for correcting the position of the tip end of the right hand of the first player object;

FIG. 18 is a diagram explaining another method for correcting the position of the tip end of the right hand of the first player object;

FIG. 20 is a diagram showing an overall structure of a program distribution system according to another embodiment of the present invention.

BEST MODE FOR CARRYING OUT THE INVENTION

In the following, one example of an embodiment of the present invention will be described in detail, based on the accompanying drawings. A game device according to an embodiment of the present invention is realized, using, e.g., a consumer game device, a portable game device, a portable phone, a personal digital assistant (PDA), a personal computer, or the like. Here, a case in which a consumer game device is used to realize a game device according to an embodiment of the present invention will be described.

Figure 1:
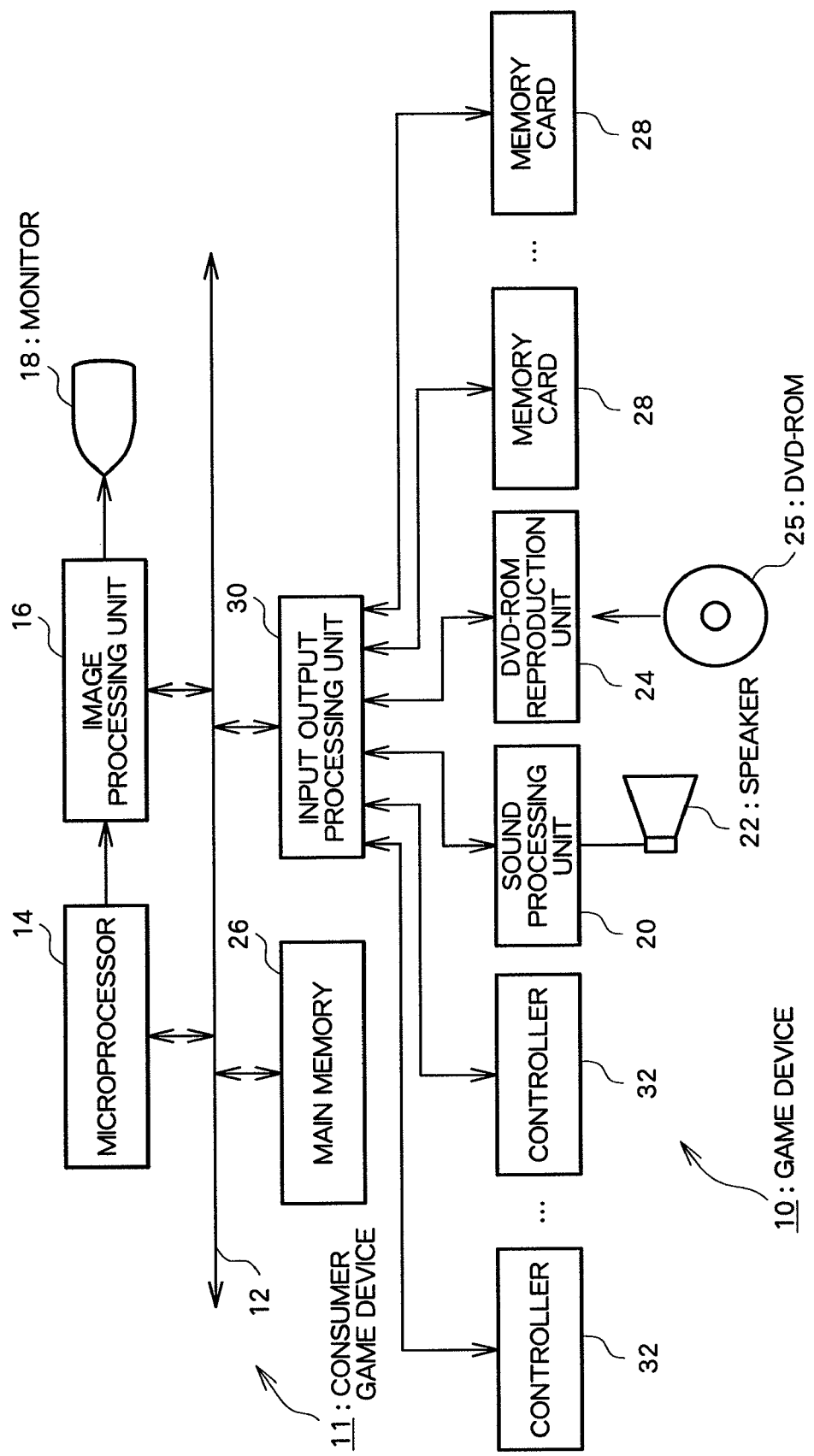
FIG. 1 is a diagram showing a hardware structure of a game device according to an embodiment of the present invention.

FIG. 1 is a diagram showing an overall structure of a game device according to an embodiment of the present invention. A game device 10 shown in FIG. 1 comprises a consumer game device 11, a DVD-ROM 25, a memory card 28, a monitor 18, and a speaker 22. The DVD-ROM 25 and the memory card 28 are information storage media, and mounted in the consumer game device 11. The monitor 18 and the speaker 22 are connected to the consumer game device 11. As the monitor 18, e.g., a home-use television set receiver is used. As the speaker 22, e.g., a built-in speaker of a home-use television set receiver is used.

The consumer game device 11 is a publicly known computer game system, and comprises a bus 12, a microprocessor 14, an image processing unit 16, a sound processing unit 20, a DVD-ROM reproduction unit 24, a main memory 26, an input output processing unit 30, and a controller 32. Structural elements other than the controller 32 are accommodated in the enclosure of the consumer game device 11.

The bus 12 is used to exchange an address and data among the respective units of the consumer game device 11. The microprocessor 14, image processing unit 16, main memory 26, and input output processing unit 30 are connected via the bus 12 for data exchange.

The microprocessor 14 controls the respective units of the consumer game device 11, based on an operating system stored in a ROM (not shown), a program and data read from the DVD-ROM 25, and data read from the memory card 28. The main memory 26 comprises, e.g., a RAM. A program and data read from the DVD-ROM 25 or the memory card 28 is written into the main memory 26 when required. The main memory 26 is used also as a working memory of the microprocessor 14.

The image processing unit 16 includes a VRAM, and renders a game screen image into the VRAM, based on the image data sent from the microprocessor 14. The image processing unit 16 converts the game screen image into a video signal, and outputs the resultant video signal at a predetermined time to the monitor 18.

The input output processing unit 30 is an interface via which the microprocessor 14 accesses the sound processing unit 20, DVD-ROM reproduction unit 24, memory card 28, and controller 32. The sound processing unit 20, DVD-ROM reproduction unit 24, memory card 28, and controller 32 are connected to the input output processing unit 30.

The sound processing unit 20 includes a sound buffer, in which various sound data, such as game music, game sound effects, messages, and so forth, read from the DVD-ROM 25 are stored. The sound processing unit 20 reproduces the various sound data stored in the sound buffer, and outputs via the speaker 22.

The DVD-ROM reproduction unit 24 reads a program recorded in the DVD-ROM 25 according to an instruction from the microprocessor 14. Note that although the DVD-ROM 25 is used here to supply a program to the consumer game device 11, any other information storage medium, such as a CD-ROM, a ROM card, and the like, may be used. Alternatively, a program may be supplied to the consumer game device 11 from a remote place through a communication network, e.g., the Internet, and the like.

The memory card 28 includes a nonvolatile memory (e.g., EEPROM, and the like). The consumer game device 11 has a plurality of memory card slots, in which to mount the memory card 28. Various game data, e.g., save data and the like, is stored in the memory card 28.

The controller 32 is a general purpose operation input means, using which a user inputs various game operations. The input output processing unit 30 scans the states of the respective units of the controller 32 every constant cycle (e.g., every $1/60^{th}$ of a second), and forwards an operating signal describing the scanning result through the bus 12 to the microprocessor 14. The microprocessor 14 determines a game operation carried out by the user, based on the operating signal. It is possible to connect a plurality of controllers 32 to the consumer game device 11. The microprocessor 14 controls a game, based on the operating signals input from the respective controllers 32.

In the game device 10 having the above-described structure, a game program read from the DVD-ROM 25 is carried out, whereby, e.g., a soccer game is carried out.

Figure 2:
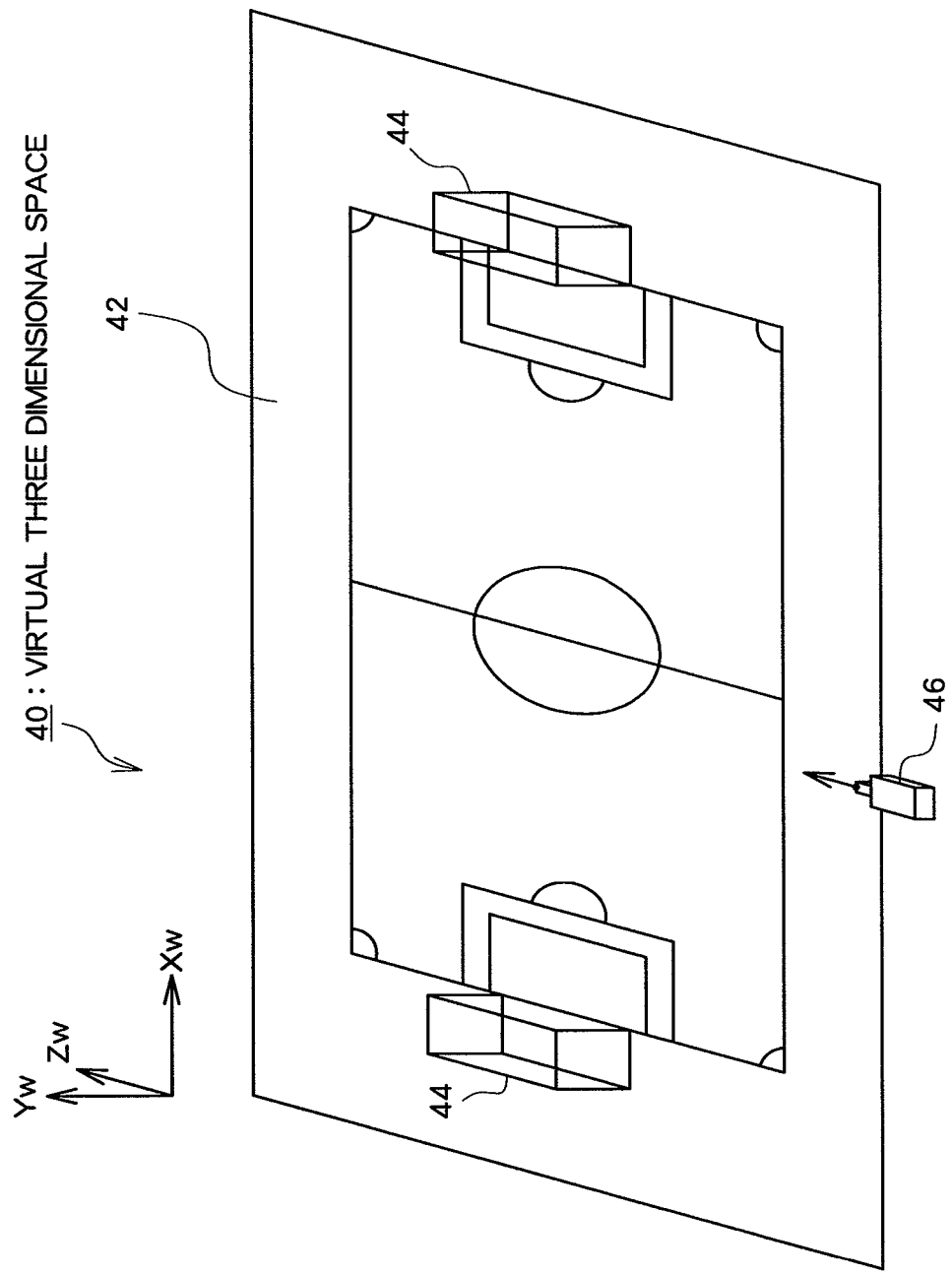
FIG. 2 is a diagram showing one example of a virtual three dimensional space.

In the main memory 26 of the game device 10, a virtual three dimensional space is created. FIG. 2 shows one example of the virtual three dimensional space. As shown in FIG. 2, a field object 42 representing a soccer field and goal objects 44 representing goals are placed in the virtual three dimensional space 40. Although not shown in FIG. 2, a player object 50 representing a soccer player with a uniform on and a ball object representing a soccer ball are placed on the field object 42.

Figure 3:
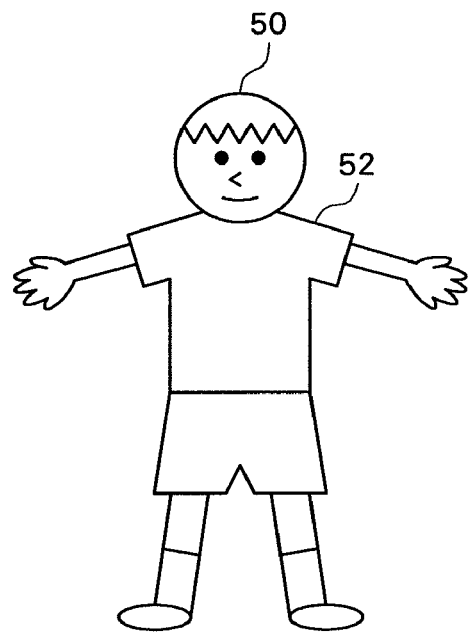
FIG. 3 is a diagram showing one example of a player object.

FIG. 3 shows one example of the player object. As shown in FIG. 3, the player object 50 includes a uniform object 52. The player object 50 includes a plurality of polygons. The uniform object 52 includes a plurality of polygons.

Figure 4:
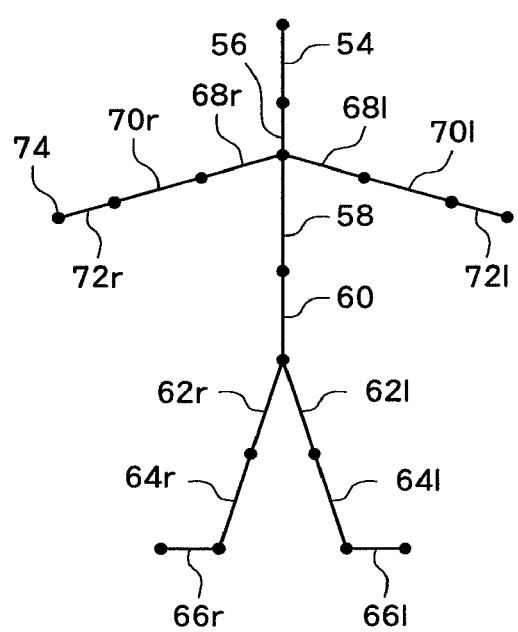
FIG. 4 is a diagram showing one example of a skeleton set on the player object.
Figure 5:
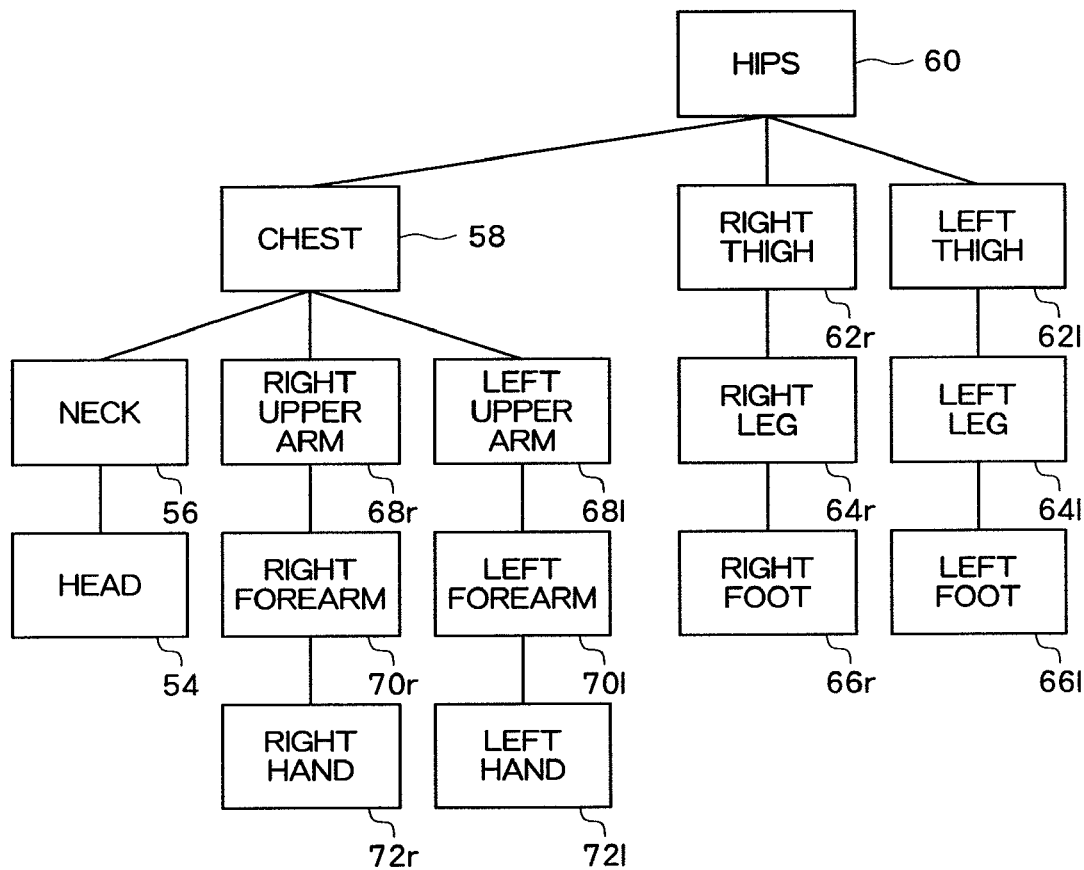
FIG. 5 is a diagram showing one example of a hierarchical structure of the skeleton set on the player object.

A skeleton (bones and joints) is set inside the player object 50. FIGS. 4 and 5 show one example of a skeleton set on the player object 50. In the example shown in FIGS. 4 and 5, skeleton parts of a head 54, a neck 56, a chest 58, hips 60, a left thigh 62l, a right thigh 62r, a left leg 64l, a right leg 64r, a left foot 66l, a right foot 66r, a left upper arm 68l, a right upper arm 68r, a left forearm 70l, a right forearm 70r, a left hand 72l, and a right hand 72r are set on the player object 50.

These skeleton parts are managed in a hierarchical structure with the hips 60 as a route, such as is shown in FIG. 5. With a certain skeleton part (bone) rotating, a skeleton part lower in hierarchy moves following the rotating skeleton part. For example, with the right upper arm 68r rotating, the right forearm 70r and the right hand 72r, which are the skeleton parts lower than the right upper arm 68r in hierarchy, move according to the rotating right upper arm 68r. The position of a skeleton part in the lowest layer is specified according to the state (a rotational angle, and the like) of the skeleton part higher than that skeleton part in hierarchy. For example, the position of the right hand 72r is specified according to the rotational angle, and the like, of the right upper arm 68r, the right forearm 70r, and the like. Also, it is possible to specify the state (a rotational angle, and the like) of a skeleton part higher than a skeleton part in the lowest layer, based on the state of the skeleton part in the lowest layer (an inverse kinematics method). For example, the rotational angles of the right upper arm 68r, the right forearm 70r, and the like, can be specified based on the position of the right hand 72r.

A skeleton part (bone) set on the player object 50 and a vertex of a polygon forming the player object 50 are correlated to each other. Then, when a skeleton part (bone) rotates, the vertex of the polygon correlated to that skeleton part moves according to the rotating skeleton part. As a result, the shape (posture) of the player object 50 will change according to the rotation of the skeleton part.

A virtual camera 46 is placed in the virtual three dimensional space 40. A game screen image showing a picture obtained by viewing the virtual three dimensional space 40 from the virtual camera 46 is displayed on the monitor 18.

In the main memory 26, information describing the state (a position, a posture, a moving speed, a movement direction, and the like) of each player object 50 placed in the virtual three dimensional space 40 is stored. For example, as the posture of the player object 50 is specified according to the states (a rotational angle, and the like) of the respective skeleton parts of the player object 50, information describing the states of the respective skeleton parts of the player object 50 is stored in the main memory 26 as information describing the posture of the player object 50. In addition, in the main memory 26, information describing the state (a position, a moving speed, a movement direction, and the like) of the ball object and the state (a position, a viewing direction, an angle of view, and the like) of the virtual camera 46 are also stored. The information stored in the main memory 26 is updated every predetermined period of time ($1/30^{th}$ of a second in this embodiment). In addition, based on the information, a game screen image is updated every predetermined period of time ($1/30^{th}$ of a second in this embodiment).

Note that, in this specification, updating the information describing the states of the player object 50, the ball object, and the virtual camera 46, stored in the main memory 26 is referred to as "updating the states of the player object 50, the ball object, and the virtual camera 46"

In the following, a technique for preferably expressing a picture showing a player object 50 grabbing and pulling the uniform object 52 of a player object 50 belonging to the opponent team (hereinafter referred to as an "opponent player object") in a soccer game will be described.

In the game device 10, whether or not the player object 50 satisfies a condition for starting a motion of grabbing the uniform object 52 of the opponent player object (hereinafter referred to as a "grabbing motion") is determined. Specifically, the microprocessor 14 determines whether or not the player object 50 satisfies a condition for starting a grabbing motion as described below.

Initially, the microprocessor 14 determines whether or not a grab point of any opponent player object is included in a predetermined area ahead of the player object 50.

Figure 6:
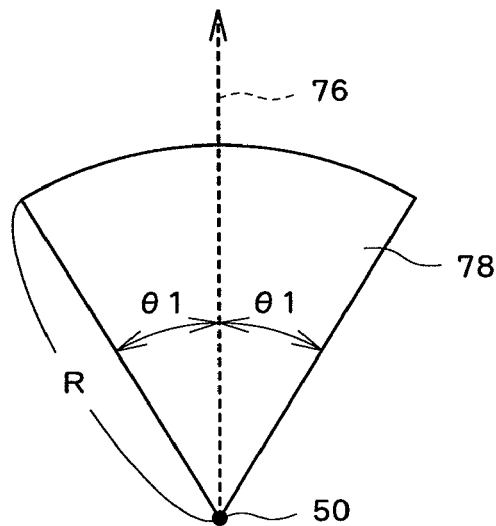
FIG. 6 is a diagram explaining a predetermined area ahead of the player object.

FIG. 6 is a diagram explaining the predetermined area ahead of the player object 50. As shown in FIG. 6, the predetermined area 78 ahead of the player object 50 is an area with the angle relative to the forward direction 76 of the player object 50 being equal to or smaller than a reference angle θ1, and the distance from the player object 50 being equal to or shorter than a reference distance R.

Figure 7:
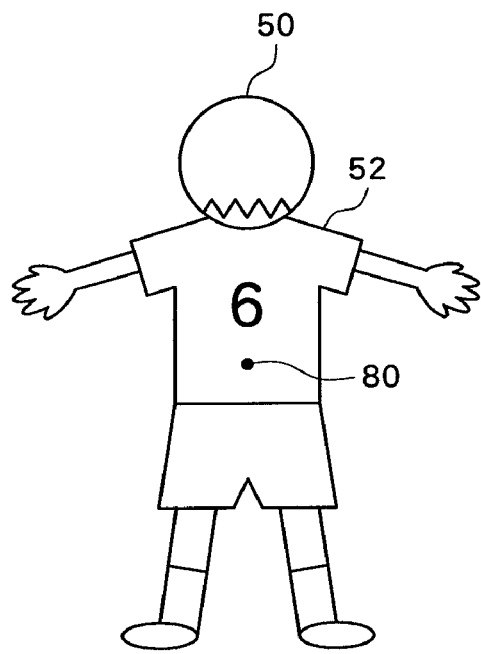
FIG. 7 is a diagram explaining a grab point.

FIG. 7 is a diagram explaining a grab point. As shown in FIG. 7, the grab point 80 is set on the rear side of the hips of each player object 50. Note that a plurality of grab points 80 may be set on each player object 50. For example, two grab points 80 may be set on each player object 50, one on the right and another on the left on the rear side of the hips of each player object 50.

Figure 8:
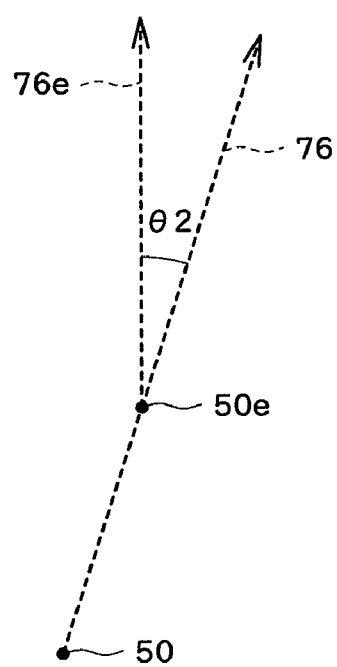
FIG. 8 is a diagram explaining a method for determining whether or not an opponent player object has its back toward the player object.

When it is determined that a grab point 80 of any opponent player object is included in the predetermined area 78 ahead of the player object 50, the microprocessor 14 determines whether or not the opponent player object has its back toward the player object 50. FIG. 8 is a diagram explaining a method for determining whether or not the opponent player object has its back toward the player object 50. The microprocessor 14 determines whether or not the angle θ2 formed by the forward direction 76 of the player object 50 and the forward direction 76e of the opponent player object 50e is equal to or smaller than a reference angle. Then, when the angle θ2 formed by the forward direction 76 of the player object 50 and the forward direction 76e of the opponent player object 50e is equal to or smaller than the reference angle, the microprocessor 14 determines that the opponent player object 50e has its back toward the player object 50. Meanwhile, when the angle θ2 formed by the forward direction 76 of the player object 50 and the forward direction 76e of the opponent player object 50e is not equal to or smaller than the reference angle, the microprocessor 14 determines that the opponent player object 50e does not have its back toward the player object 50.

When the grab point 80 of the opponent player object is included in the predetermined area 78 ahead of the player object 50 and the opponent player object has its back toward the player object 50, the microprocessor 14 determines that the player object 50 satisfies the condition for starting a grabbing motion. Then, the microprocessor 14 causes the player object 50 to start a motion of grabbing the uniform object 52 of the opponent player object.

Figure 9:
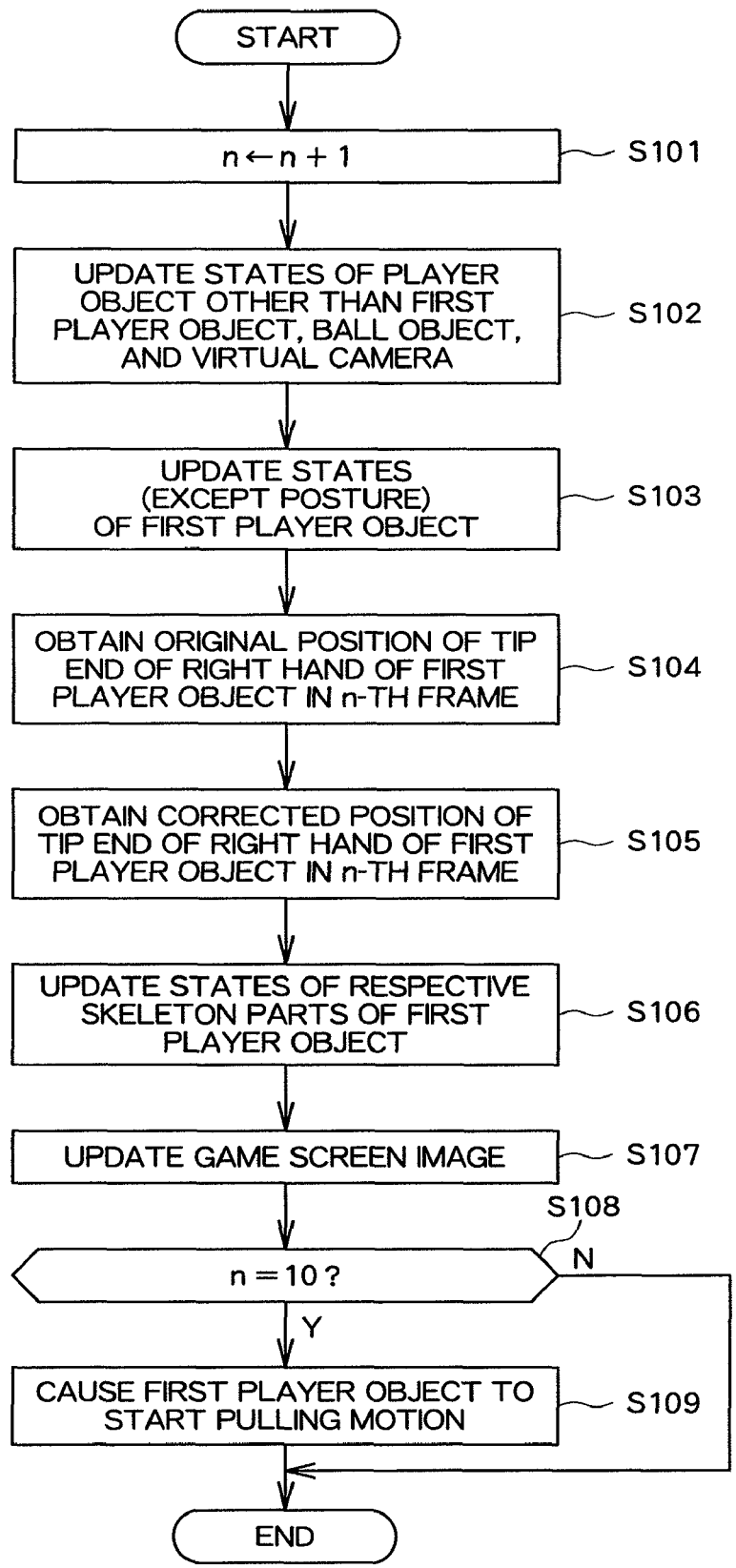
FIG. 9 is a flowchart of a process for displaying a picture showing a first player object grabbing the uniform object of a second player object.

In the following, a process to be carried out to display a picture showing a player object 50 grabbing the uniform object 52 of an opponent player object will be described. FIG. 9 is a flowchart of a process to be carried out every predetermined period of time (1/30th of a second in this embodiment) after determination that the player object 50 satisfies the condition for starting a grabbing motion. The microprocessor 14 carries out the process shown in FIG. 9 according to a program read from the DVD-ROM 25.

Note that the player object 50 which is determined as satisfying the condition for starting a grabbing motion, that is, the player object 50 which is to grab the uniform object 52, will be hereinafter referred to as a "first player object". An opponent player object of which the uniform object 52 is to be grabbed by the first player object will be hereinafter referred to as a "second player object". Further, the following description is made based on the assumption that the first player object (first character object) tries to grab the uniform object 52 (clothing object) of the second player object (second character object) with its right hand.

The process shown in FIG. 9 is carried out, based on motion data stored in the DVD-ROM 25 (motion data storage means). Motion data is data for reproducing various motions of the player object 50. More specifically, motion data is data describing the state (a rotational angle, and the like) of each skeleton part in each of the frames with the player object 50 performing various motions. Motion data for reproducing a basic motion of the player object 50 trying to grab the uniform object 52 of another player object 50 (hereinafter referred to as "motion data on a grabbing motion") is also stored in the DVD-ROM 25.

The following description is given based on the assumption that motion data on a grabbing motion defines the states (a rotational angle, and the like) of the respective skeleton parts (the right upper arm 68r, the right forearm 70r, the hand 72r, and so forth) in each of the frames from the first frame (a grabbing motion start frame) to the tenth frame (a grabbing motion completion frame). In addition, the description is made based on the assumption that one frame is 1/30th of a second long.

As shown in FIG. 9, initially, the microprocessor 14 adds one to the value of the variable n (S101). Note that the value of the variable n is initialized to 0 when the first player object starts a grabbing motion. Therefore, the variable n shows a numeric value indicating the number of frames having passed after the first player object starts the grabbing motion.

Thereafter, the microprocessor 14 updates the states of a player object 50 other than the first player object, the ball object, and the virtual camera 46 (S102). In addition, the microprocessor 14 updates the states (except posture) of the first player object (S103). Then, the microprocessor 14 carries out a process (S104 to S106) for updating the posture of the first player object.

Initially, the microprocessor 14 obtains the original position of the tip end 74 of the right hand 72r of the first player object in the $n^{th}$ frame (S104). That is, the microprocessor 14 reads the states of the respective skeleton parts in the $n^{th}$ frame from the motion data on a grabbing motion. Then, the microprocessor 14 obtains the position (original position) of the tip end 74 of the right hand 72r, the position being specified according to the states of the respective skeleton parts in the $n^{th}$ frame.

Further, the microprocessor 14 corrects the original position of the tip end 74 of the right hand 72r of the first player object in the $n^{th}$ frame, obtained at S104, to thereby obtain the position (corrected position) of the tip end 74 of the right hand 72r of the first player object in the $n^{th}$ frame (S105).

A positional relationship between the first player object and the second player object varies from time to time. Therefore, moving the respective skeleton parts (the right upper arm 68r, the right forearm 70r, the right hand 72r, and the like) of the first player object according to the motion data on a grabbing motion may not be enough to have the tip end 74 of the right hand 72r of the first player object reach the grab point 80 of the second player object. In view of the above, the microprocessor 14 corrects the position of the tip end 74 of the right hand 72r of the first player object.

Figure 10:
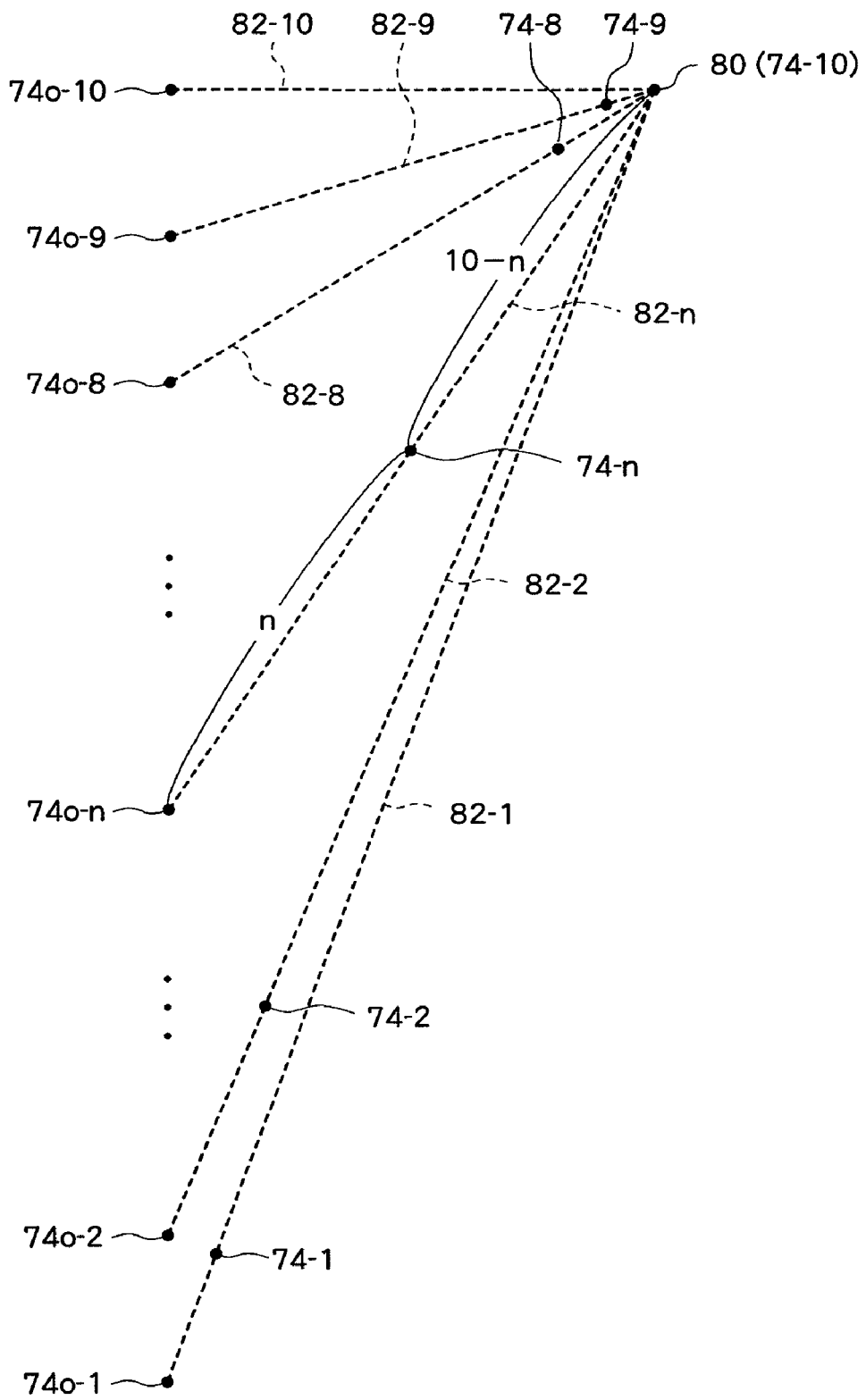
FIG. 10 is a diagram explaining a method for correcting the position of the tip end of the right hand of the first player object.

FIG. 10 is a diagram explaining a method for correcting the position of the tip end 74 of the right hand 72r of the first player object. In FIG. 10, the reference numerals 74o-1, 74o-2, 74o-n, 74o-8, 74o-9, and 74o-10 indicate the original positions of the tip end 74 of the right hand 72r of the player object 50 in the first, second, $n^{th}$, eighth, ninth, and tenth frames, respectively. Further, the reference numerals 74-1, 74-2, 74-n, 74-8, 74-9, and 74-10 indicate the corrected positions of the tip end 74 of the right hand 72r of the first player object in the first, second, $n^{th}$, eighth, ninth, and tenth frames, respectively.

At S105, the microprocessor 14 obtains a position which divides the straight line 82-n from the original position 74o-n, obtained at S104, to the grab point 80 of the second player object at the ratio n:(10-n) as the corrected position 74-n of the tip end 74 of the right hand 72r of the first player object.

For example, for the variable n being 1, a position which divides the straight line 82-1 from the original position 74o-1 to the grab point 80 of the second player object at the ratio 1:9 is obtained as the corrected position 74-1 of the tip end 74 of the right hand 72r of the first player object. In addition, for example, for the variable n being 8, a position which divides the straight line 82-8 from the original position 74o-8 to the grab point 80 of the second player object at the ratio 8:2 is obtained as the corrected position 74-8 of the tip end 74 of the right hand 72r of the first player object. For the variable n being 10, a position which divides the straight line 82-10 from the original position 74o-10 to the grab point 80 of the second player object at the ratio 10:0, that is, the position of the grab point 80 of the second player object, is obtained as the corrected position 74-10 of the tip end 74 of the right hand 72r of the first player object.

After the corrected position of the tip end 74 of the right hand 72r of the first player object is obtained, the microprocessor 14 updates the states (a rotational angle) of the respective skeleton parts of the first player object (S106). That is, the microprocessor 14 determines the states of the right upper arm 68r, the right forearm 70r, and the like, which are skeleton parts of a higher hierarchical order than the right hand 72r, based on the corrected position of the tip end 74 of the right hand 72r. A publicly known inverse kinematics algorithm is used for this process. In addition, the microprocessor 14 determines the state of another skeleton part of the first player object, based on the motion data on, e.g., a running motion, and so forth.

Thereafter, the microprocessor 14 creates a game screen image in the VRAM (S107). In the above, the microprocessor 14 deforms the polygons forming the player object 50, based on the states of the respective skeleton parts. That is, the microprocessor 14 sets the positions of the vertexes of the polygons forming the player object 50, based on the states of the respective skeleton parts. The game screen image created in the VRAM is output to the monitor 18 at a predetermined time.

Then, the microprocessor 14 determines whether or not the value of the variable n is 10 (S108). Here, the value "10" indicates the total number of frames of the motion data on a grabbing motion. When the value of the variable n is not 10, after elapse of a predetermined period of time ($\frac{1}{30}^{th}$ of a second in this embodiment), the process shown in FIG. 9 is carried out again. Meanwhile, when the value of the variable n is 10, a grabbing motion is completed. In this case, the microprocessor 14 causes the first player object to start a motion of pulling the uniform object 52 of the second player object (hereinafter referred to as a "pulling motion"). In this case, after elapse of a predetermined period of time ($\frac{1}{30}^{th}$ of a second in this embodiment), a process (see FIG. 12) for displaying a picture showing the first player object pulling the uniform object 52 of the second player object is carried out, instead of the process shown in FIG. 9.

With the above described process (FIG. 9) being repetitively carried out every predetermined period of time, a picture showing the first player object grabbing the uniform object 52 of the second player object (grab point 80) is shown as a game screen image.

In this embodiment, the position of the tip end 74 of the right hand 72r of the first player object is corrected using the method shown in FIG. 10, so that the tip end 74 of the right hand 72r of the first player object reaches the grab point 80 of the second player object in the grab motion completion frame (tenth frame). Further, as the position of the tip end 74 of the right hand 72r of the first player object is gradually corrected, unnatural movement of the right hand of the first player object can be avoided.

Note that the position of the tip end 74 of the right hand 72r of the player object 50 may be corrected using another method. FIG. 11 is a diagram explaining another method for correcting the tip end 74 of the hand 72 of the player object 50. Also in FIG. 11, the reference numerals 74o-1, 74o-2, 74o-n, 74o-8, 74o-9, and 74o-10 indicate the original positions of the tip end 74 of the right hand 72r of the first player objects in the first, second, $n^{th}$, eighth, ninth, and tenth frames, respectively, and the reference numerals 74-1, 74-2, 74-n, 74-8, 74-9, and 74-10 indicate the corrected positions of the tip end 74 of the right hand 72r of the first player object in the first, second, $n^{th}$, eighth, ninth, and tenth frames, respectively.

In this case, the microprocessor 14 adds (n/10)*ΔP1 to the original position 74o-n at S105 to thereby obtain the corrected position 74-n of the tip end 74 of the right hand 72r of the first player object, ΔP1 indicating the difference between the original position 74o-10 of the tip end 74 of the right hand 72r of the first player object in the grabbing motion completion frame (tenth frame) and the grab point 80 of the second player object.

For example, for the value of the variable n being 1, addition of (1/10)*ΔP1 to the original position 74o-1 provides the corrected position 74-1 of the tip end 74 of the right hand 72r of the first player object. Further, for example, for the value of the variable n being 8, addition of (8/10)*ΔP1 to the original position 74o-8 provides the corrected position 74-8 of the tip end 74 of the right hand 72r of the first player object. Then, for the value of the variable n being 10, addition of (10/10)*ΔP1 to the original position 74o-10 provides the corrected position 74-10 of the tip end 74 of the right hand 72r of the first player object. That is, the position of the grab point 80 of the second player object is obtained as the corrected position 74-10.

Using the above describe method as well, the tip end 74 of the right hand 72r of the first player object reaches the grab point 80 of the second player object in the grabbing motion completion frame (tenth frame), and unnatural movement of the right hand of the first player object can be avoided.

Note that use of the correction method shown in FIG. 10 results in a larger movement distance of the right hand 72r of the first player object in the first and second frames, compared to that of the right hand 72r of the first player object in the ninth and tenth frames. Regarding this point, use of the correction method shown in FIG. 11 can suppress occurrence of such a difference in the movement distance. As a result, naturalness in movement of the right hand of the first player object can be enhanced.

Figure 12:
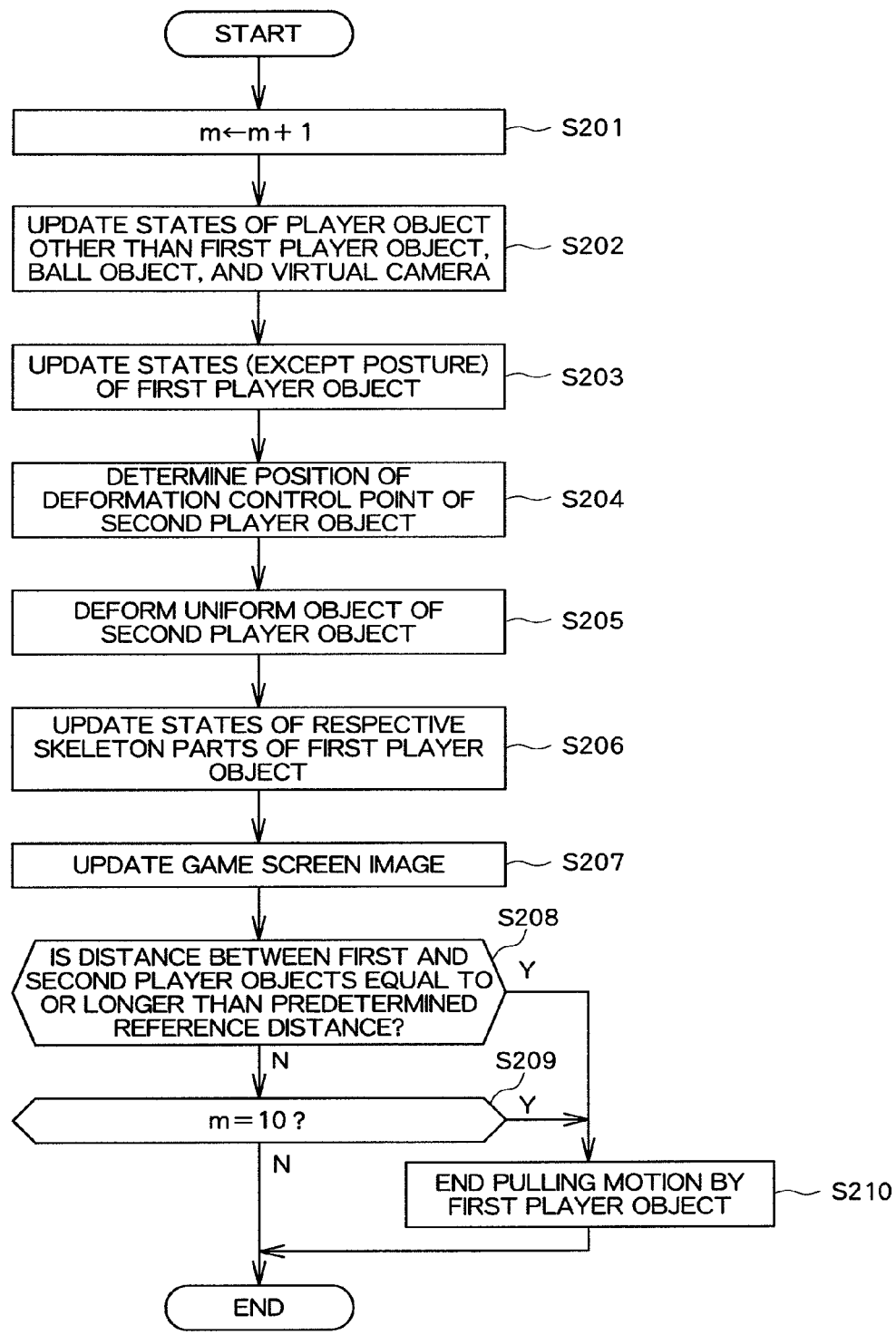
FIG. 12 is a flowchart of a process for displaying a picture showing the first player object pulling the uniform object of the second player object.

In the following, a process for displaying a picture showing the first player object pulling the uniform object 52 of the second player object will be described. FIG. 12 is a flowchart of a process to be carried out every predetermined period of time ($\frac{1}{30}^{th}$ of a second in this embodiment) to display a picture showing the first player object pulling the uniform object 52 of the second player object. The microprocessor 14 carries out the process shown in FIG. 12 according to a program read from the DVD-ROM 25.

As shown in FIG. 12, initially, the microprocessor 14 adds one to the value of the variable m (S201). Note that the value of the variable m is initialized to 0 when the first player object starts a pulling motion. Therefore, the variable m shows a numeric value indicating the number of frames having passed after the first player object starts the pulling motion.

Thereafter, the microprocessor 14 updates the states of a player object 50 other than the first player object, the ball object, and the virtual camera 46 (S202). In addition, the microprocessor 14 updates the states (except posture) of the first player object (S203). The microprocessor 14 carries out a process (S204 to 5206) for updating the posture of the first player object.

Initially, the microprocessor 14 determines the position of a deformation control point (a reference point) of the second player object (S204). A deformation control point is a basic point for controlling deformation of the uniform object 52. In this embodiment, a deformation control point, as well as the grab point 80, is set on each player object 50. Some of the vertexes of the polygons forming the uniform object 52 of the player object 50 are correlated to the deformation control point, and the vertex correlated to the deformation control point moves according to the deformation control point, with details thereof to be described later (see FIGS. 15 and 16).

With the uniform object 52 of the player object 50 not being pulled by another player object 50, the position of the deformation control point of the player object 50 is set at a predetermined basic position. The basic position may be, e.g., the position of the grab point 80. Meanwhile, with the uniform object 52 of the player object 50 being pulled by another player object 50, the position of the deformation control point of the player object 50 is determined as described below.

Figure 13:
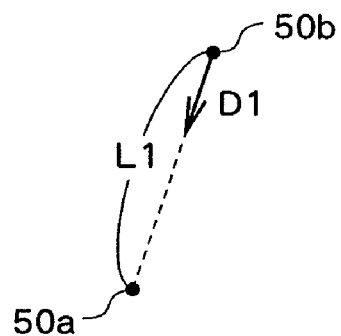
FIG. 13 is a diagram explaining a method for determining the position of a deformation control point of the second player object.
Figure 14:
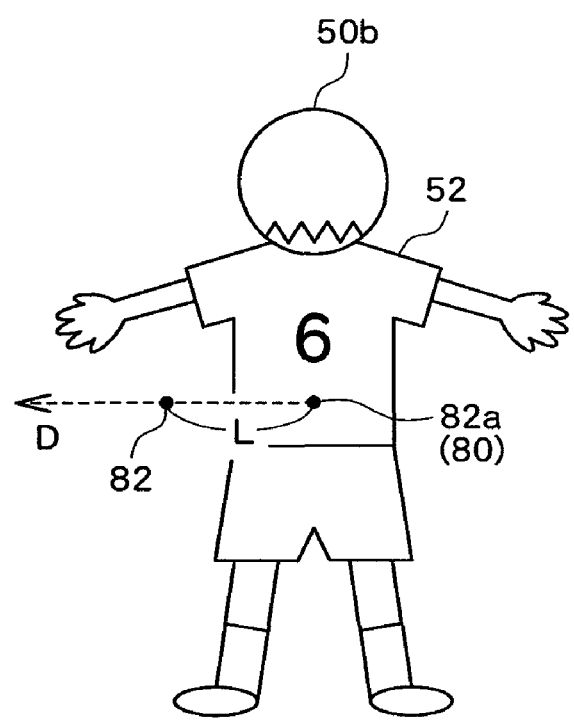
FIG. 14 is a diagram explaining a method for determining the position of the deformation control point of the second player object.

That is, the microprocessor 14 determines the position of the deformation control point of the second player object, based on the positional relationship between the first player object and the second player object. FIGS. 13 and 14 are diagrams explaining a method for determining the position of the deformation control point of the second player object.

Initially, the microprocessor 14 (direction obtaining means) obtains the direction D1 from the position (e.g., the foot position) of the second player object 50b to the position (e.g., the foot position) of the first player object 50a (see FIG. 13). In addition, the microprocessor 14 (distance obtaining means) obtains the distance L1 from the position of the second player object 50b to the position of the first player object 50a (see FIG. 13).

Then, the microprocessor 14 (clothing object control means) sets the position of the deformation control point 82 of the second player object 50b at a position displaced by the distance L in the direction D from the basic position 82a (grab point 80) of the deformation control point 82 of the second player object 50b (see FIG. 14). Note that the direction D is a direction in parallel to the direction D1 and that the distance L is determined using the following expression (1).

$$L = L1 * |\sin((m/10)*2\pi)| \quad (1)$$

As described above, the distance L is obtained by multiplying the distance L1 from the position of the second player object 50b to the position of the first player object 50a by a factor (the absolute value of $\sin((m/10)*2\pi)$) which varies as time passes. Therefore, even if the state in which the distance L1 from the position of the second player object 50b to the position of the first player object 50a remains the same continues for a predetermined period of time, the distance L will change as time passes, and resultantly, the position of the deformation control point 82 of the second player object 50b will change as time passes.

After determination of the position of the deformation control point 82 of the second player object, the microprocessor 14 (clothing object control means) deforms the uniform object 52 of the second player object, based on the position of the deformation control point 82 of the second player object (S205).

Figure 15:
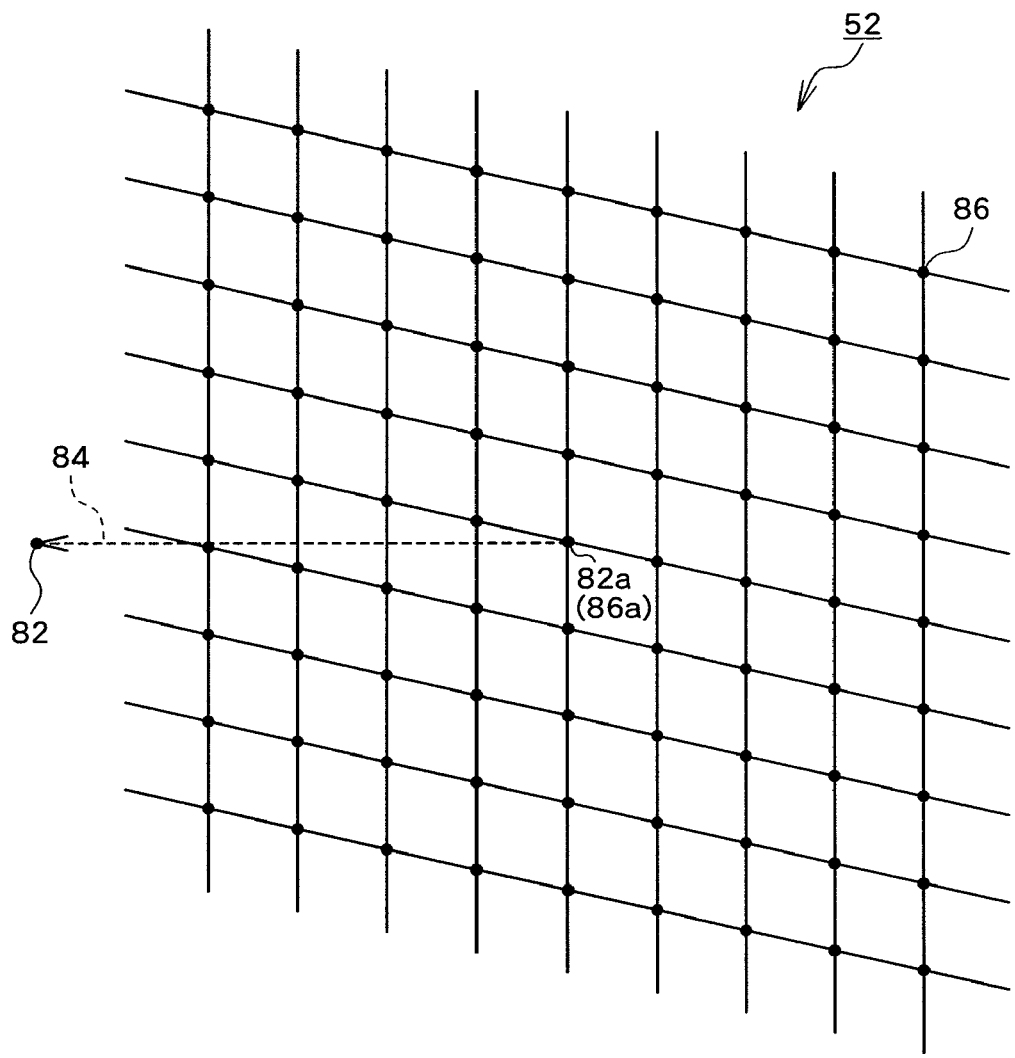
FIG. 15 is a diagram explaining deformation of the uniform object of the second player object.
Figure 16:
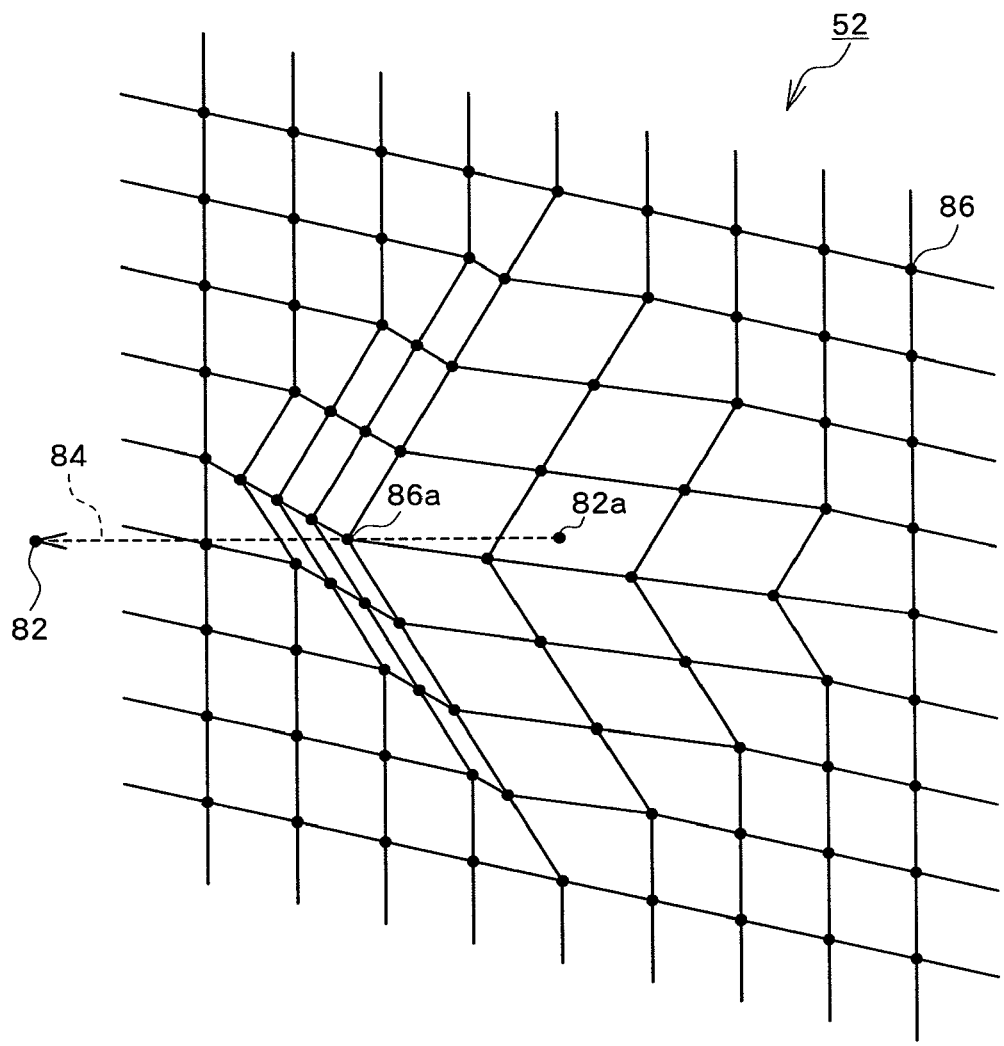
FIG. 16 is a diagram explaining deformation of the uniform object of the second player object.

FIGS. 15 and 16 are diagrams explaining deformation of the uniform object 52 of the second player object. FIGS. 15 and 16 show a part of the uniform object 52 of the second player object. FIG. 15 shows the uniform object 52 not deformed; FIG. 16 shows the uniform object 52 deformed. The plurality of points (reference numeral 86) shown in FIGS. 15 and 16 indicate the vertexes of the polygons forming the uniform object 52 of the second player object. The reference numeral 86a indicates a vertex (hereinafter referred to as a "representative vertex") located closest to the basic position 82a (grab point 80) of the deformation control point 82 of the second player object among the vertexes of the polygons forming the uniform object 52 of the second player object.

The microprocessor 14 causes the representative vertex 86a of the uniform object 52 of the second player object and vertexes 86 around the representative vertex 86a to move according to the deformation control point 82 of the second player object. Specifically, the microprocessor 14 moves the representative vertex 86a of the uniform object 52 of the second player object and the vertexes 86 around the representative vertex 86a parallel to the direction 84 from the basic position 82a of the deformation control point 82 of the second player object to the current position of the deformation control point 82, determined at 5204. In the above, the movement distance of each vertex 86 is determined based on the distance between the vertex 86 and the representative vertex 86a. Specifically, a vertex 86 located farther from the representative vertex 86a is set to move by a shorter distance.

Note that the representative vertex 86a and the vertexes 86 around this reference vertex 86a are correlated additionally to the skeleton parts of chest 58, hips 60, and the like, of the second player object. Therefore, as the second player object moves ahead and the skeleton parts of chest 58 and hips 60 of the second player object accordingly move ahead, the representative vertex 86a and the vertexes 86 around the representative vertex 86a will be pulled additionally in the movement direction (the forward direction) of the second player object. Therefore, the movement distances of the representative vertex 86a and the vertexes 86 around the reference vertex 86a are determined based on both the movement of the deformation control point 82 of the second player object and the movement of the second player object itself.

After completion of the process of deforming the uniform object 52 of the second player object, the microprocessor 14 updates the states (a rotational angle, and the like) of the respective skeleton parts of the first player object 50, based on the position of the representative vertex 86a of the uniform object 52 of the second player object (S206).

Initially, the microprocessor 14 sets the position of the tip end 74 of the right hand 72r of the first player object at the position of the representative vertex 86a of the uniform object 52 of the second player object. Thereafter, the microprocessor 14 updates the states of the right upper arm 68r, the right forearm 70r, and the like, which are the skeleton parts of higher hierarchical order than the right hand 72r, based on the position of the tip end 74 of the right hand 72r. A publicly known inverse kinematics algorithm is used for this process. In addition, the microprocessor 14 updates the state of another skeleton part of the first player object, based on the motion data on, e.g., a running motion.

Thereafter, the microprocessor 14 produces a game screen image in the VRAM (S207). In the above, the microprocessor 14 deforms the polygons forming the player object 50, based on the states (a rotational angle) of the respective skeleton parts. That is, the microprocessor 14 sets the positions of the vertexes of the polygons forming the player object 50, based on the states of the respective skeleton parts. The game screen image produced in the VRAM is output to the monitor 18 at a predetermined time.

Thereafter, the microprocessor 14 determines whether or not the distance between the first player object and the second player object is equal to or longer than a predetermined distance (S208). When the distance between the first player object and the second player object is equal to or longer than the predetermined distance, the microprocessor 14 determines that the second player object has shaken off the first player object, and then causes the first player object to finish the pulling motion relative to the second player object (S210).

Meanwhile, when the distance between the first player object and the second player object is shorter than the predetermined distance, the microprocessor 14 then determines whether or not the value of the variable m is 10 (S209). With the value of the variable m being 10, the microprocessor 14 causes the first player object to finish the pulling motion relative to the second player object (S210). As described above, it is arranged in this embodiment such that a pulling motion by the first player object relative to the second player object is finished after continuation for ⅓ (=10/30) of a second. Note that, however, a longer period of time may be set as a duration in which the first player object continues a pulling motion relative to the second player object.

With the above described process (FIG. 12) being repetitively carried out every predetermined period of time, a picture showing the first player object pulling the uniform object of the second player object and a picture showing the uniform object 52 of the second player object being deformed as though being pulled are shown as game screen images.

Note that displaying a picture showing the uniform object 52 of the second player object being pulled by the first player object and thereby deformed can also be realized by carrying out a physical simulation operation, which, however, results in a complicated process and a heavy processing load. Regarding this point, according to the present invention, displaying a picture showing the uniform object 52 of the second player object being pulled by the first player object and thereby deformed can be realized through a relatively simple process of changing the position of the deformation reference point 82 of the second player object, based on the positional relationship (the direction D1 and the distance L1) between the first player object and the second player object. That is, reduction of a processing load can be attained.

Also, in this embodiment, even if the state in which the distance L1 from the position of the second player object to the position of the first player object (see FIG. 13) remains the same continues for a predetermined period of time, the position of the deformation control point 82 of the second player object will change. Therefore, even if the state in which the distance L1 from the position of the second player object to the position of the first player object (see FIG. 13) remains the same continues for a predetermined period of time, the extent of deformation of the uniform object 52 of the second player object will change. As a result, the reality of a picture showing the uniform object 52 of the second player object, being pulled by the first player object and thereby deformed, is improved.

Also, in this embodiment, after the uniform object 52 of the second player object is deformed in consideration of the position of the deformation control point 82 and rotation of the skeleton parts of chest 58, hips 60, and the like, of the second player object, the position of the right hand 72r of the first player object is determined in accordance with the state of the deformation of the uniform object 52. Then, the posture (the states of the respective skeleton parts) of the first player object is determined based on the position of the right hand 72r. According to the present invention, when expressing a picture showing the uniform object 52 of the second player object, being pulled by the first player object and thereby deformed, it is possible to express the picture showing the uniform object 52 of the second player object, being deformed in consideration of the motion (movement, and the like) of the second player object itself. As a result, the reality of the picture showing the uniform object 52 of the second player object, being pulled by the first player object and thereby deformed is improved.

Note that the deformation control point 82 (the direction D and the distance L) of the second player object may be determined using the motion data on the motion of moving its right hand grabbing the uniform object 52 of another player object 50 so as to pull the uniform object 52. In the following, this determination method will be described. The following description is given based on the assumption that the above-described motion data describes the states (a rotational angle, and the like) of the respective skeleton parts of the player object 50 in the respective frames from the first frame (motion start frame) to the tenth frame (motion completion frame).

In this case, at S204, initially, the microprocessor 14 reads the states of the respective skeleton parts in the $m^{th}$ frame from the above-described motion data. Then, the microprocessor 14 obtains the position (original position) of the tip end 74 of the right hand 72r (predetermined portion) of the first player object, the position being specified according to the states of the respective skeleton parts in the $m^{th}$ frame. Thereafter, the microprocessor 14 (predetermined portion position obtaining means) obtains a position (corrected position) by correcting the obtained original position, using the method described below.

Figure 17:
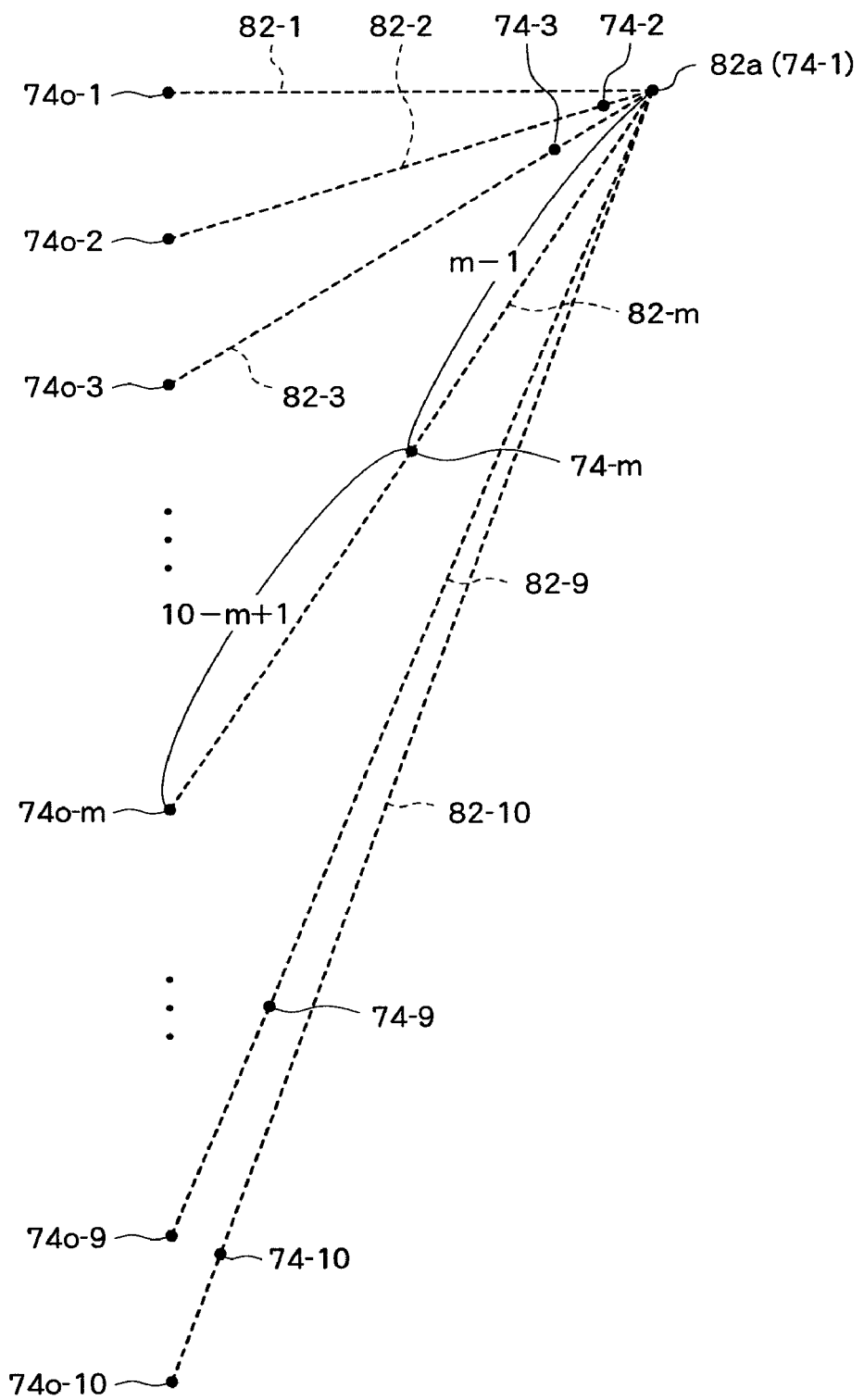
FIG. 17 is a diagram explaining a method for correcting the position of the tip end of the right hand of the first player object.

FIG. 17 is a diagram explaining a method for correcting the obtained original position. In FIG. 17, the reference numerals 74o-1, 74o-2, 74o-3, 74o-m, 74o-9, and 74o-10 indicate the original positions in the first, second, third, $m^{th}$, ninth, and tenth frames, respectively, and the reference numerals 74-1, 74-2, 74-3, 74-m, 74-9, and 74-10 indicate the corrected positions in the first, second, third, $m^{th}$, ninth, and tenth frames, respectively.

The microprocessor 14 obtains a position which divides the straight line 82-m from the original position 74o-m to the basic position 82a (grab point 80) of the deformation control point 82 of the second player object at the ratio (10−m+1):(m−1) as the corrected position 74-m.

For example, for the variable m being 2, a position which divides the straight line 82-2 from the original position 74o-2 to the basic position 82a of the deformation control point 82 of the second player object at the ratio 9:1 is obtained as the corrected position 74-2. Also, for example, for the variable m being 9, a position which divides the straight line 82-9 from the original position 74o-9 to the basic position 82a of the deformation control point 82 of the second player object at the ratio 2:8 is obtained as the corrected position 74-9.

FIG. 18 is a diagram explaining another method for correcting the obtained original position. Also in FIG. 18, similar to FIG. 17, the reference numerals 74o-1, 74o-2, 74o-3, 74o-m, 74o-9, and 74o-10 indicate the original positions in the first, second, third, $m^{th}$ ninth, and tenth frames, respectively, and the reference numerals 74-1, 74-2, 74-3, 74-m, 74-9, and 74-10 indicate the corrected positions in the first, second, third, $m^{th}$, ninth, and tenth frames, respectively.

In this case, the microprocessor 14 adds ((10−m+1)/10) *ΔP2 to the original position 74o-m to thereby obtain the corrected position 74-m, ΔP2 indicating the difference between the original position 74o-1 in the first frame and the basic position 82a (grab point 80) of the deformation control point 82 of the second player object.

For example, for the variable m being 2, addition of (9/10)*ΔP2 to the original position 74o-2 provides the corrected position 74-2. For example, for the variable m being 9, addition of (2/10)*ΔP2 to the original position 74o-9 provides the corrected position 74-9.

After obtaining the corrected position 74-m, using the method shown in FIG. 17 or FIG. 18, the microprocessor 14 determines the position of the deformation control point 82 of the second player object, based on the corrected position 74-m.

Figure 19:
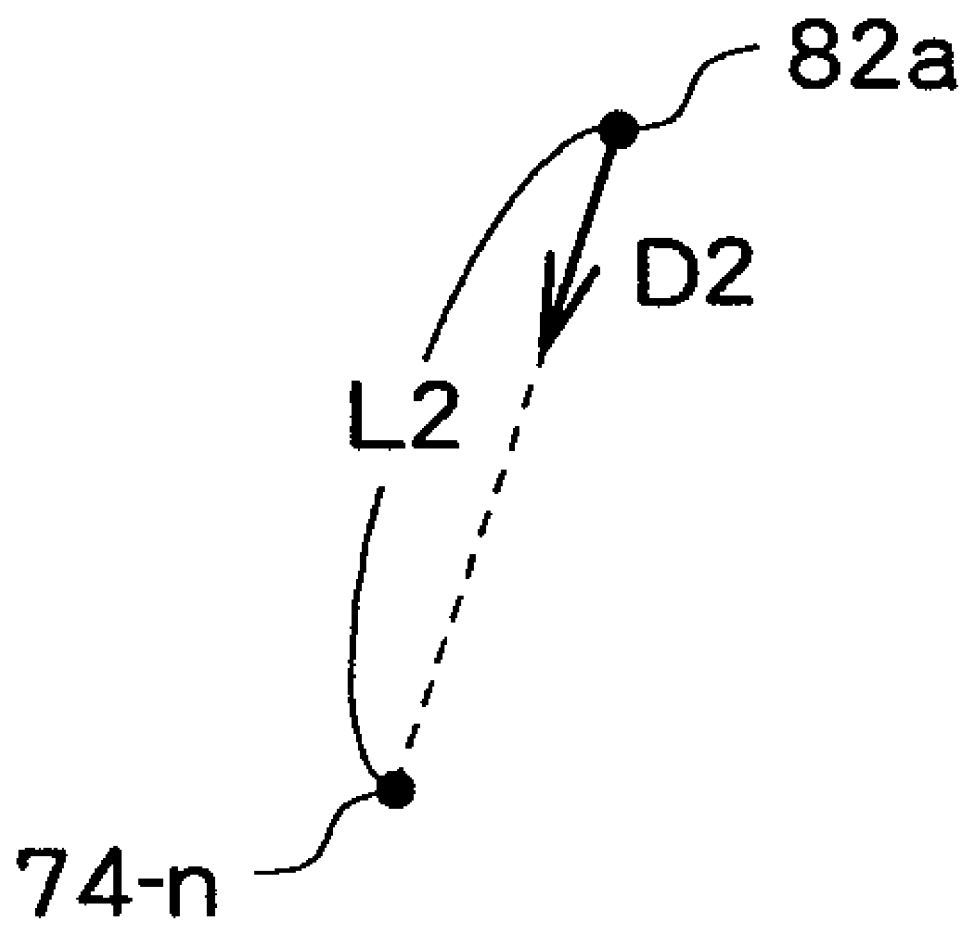
FIG. 19 is a diagram explaining another method for determining the position of the deformation control point of the second player object.

FIG. 19 is a diagram explaining a method for determining the position of the deformation control point 82 of the second player object. Initially, the microprocessor 14 (direction obtaining means) determines the direction D2 from the basic position 82a (grab point 80) of the deformation control point 82 of the second player object to the corrected position 74-m. In addition, the microprocessor 14 (distance obtaining means) obtains the distance L2 from the basic position 82a (grab point 80) of the deformation control point 82 of the second player object to the corrected position 74-m.

Then, the microprocessor 14 (clothing object control means) sets the position of the deformation control point 82 of the second player object at a position displaced by the distance L in the direction D from the basic position 82a (grab point 80) of the deformation control point 82 of the second player object 50b (see FIG. 14). Here, the direction D is a direction parallel to the direction D2, and the distance L is the distance L2.

In the above described manner, it is possible to determine the position of the deformation control point 82 of the second player object in consideration of the movement of the right hand of the first player object, pulling the uniform object 52. As a result, it is possible to deform the uniform object 52 of the second player object in consideration of the movement of the right hand of the first player object, pulling the uniform object 52. Also, in the above described manner as well, it is possible to express, through a relatively simple process, a picture showing the uniform object 52 of the second player object being pulled by the first player object, and thereby deformed.

Note that the position of the deformation control point 82 of the second player object may be determined based on the assumption that the direction D (see FIG. 14) is a direction parallel to the direction D1 (see FIG. 13) and that the distance L (see FIG. 14) is the distance L2 (see FIG. 19).

In this manner as well, it is possible to determine the position of the deformation control point 82 of the second player object in consideration of the movement of the right hand of the first player object, pulling the uniform object 52. As a result, it is possible to deform the uniform object 52 of the second player object in consideration of the movement of the right hand of the first player object, pulling the uniform object 52.

The deformation control point 82 may reciprocate between, e.g., the position determined based on the corrected position 74-1 in the first frame and the position determined based on the corrected position 74-3 in the third frame. That is, the deformation control point 82 having moved from the position determined based on the corrected position 74-1 via the position determined based on the corrected position 74-2 to the position determined based on the corrected position 74-3 may return via the position determined based on the corrected position 74-2 to the position determined based on the corrected position 74-1. Also, the deformation control point 82 having returned to the position determined based on the corrected position 74-1 may move again to the position determined by the corrected position 74-3 via the position based on the corrected position 74-2.

In the above described manner, it is possible to have the first player object continue the pulling motion relative to the second player object. For example, in the case where the first player object is the player object 50 operated by a user, it is possible to have the first player object continue the pulling motion relative to the second player object during a period in which the user continues a predetermined operation (e.g., successively pressing a button).

According to the above described game device 10, it is possible to express, through a relatively simple process, a picture showing a player object 50 grabbing and pulling the uniform object 52 of a player object 50 belonging to the opponent team.

Note that the present invention is not limited to the above-described embodiment.

For example, when the first player object pulls the uniform object 52 of the second player object, a parameter value which indicates the ability of the second player object may be corrected such that the ability of the second player object is lowered. For example, correction may be made such that the moving speed of the second player object becomes slower.

Also, for example, a game to be carried out in the game device 10 may be a sport game other than a soccer game. The present invention can be applied to a game, such as basketball, and the like, in which players may perform in contact with each other. In addition, a game to be carried out in the game device 10 may be a game other than a sport game.

For example, although a program is supplied from the DVD-ROM 25, or an information storage medium, to the consumer game device 11 in the above description, a program may be distributed through a communication network to a household, or the like. FIG. 20 is a diagram showing a complete structure of a program distribution system using a communication network. A program distribution method according to the present invention will be described, referring to FIG. 20. As shown in FIG. 20, the program distribution system 100 comprises a game database 102, a server 104, a communication network 106, a personal computer 108, a consumer game device 110, and a PDA (a personal digital assistant) 112, in which the game database 102 and the server 104 together constitute a program distribution device 114. The communication network 106 includes, e.g., the Internet and/or a cable television network. In this system, a program having content similar to that which is stored in the DVD-ROM 25 is stored in the game database (an information storage medium) 102. When a demander requests game distribution on the personal computer 108, the consumer game device 110, the PDA 112, or the like, the request is sent through the communication network 106 to the server 104. Then, the server 104 reads the program from the game database 102 in response to the game distribution request, and sends the read program back to the device having sent the game distribution request, such as the personal computer 108, the consumer game device 110, the PDA 112, or the like. Note that although game distribution is made in response to a game distribution request in the above, the server 104 may send a program one-sidedly. In addition, it is not always necessary to distribute all of the program necessary to realize a game at the same time (collective distribution), and instead, distribution of only a portion of the program necessary depending on an aspect of a game may be applicable (dividing distribution). Game distribution through the communication network 106, as described above, makes it easier for a demander to obtain a program.

The invention claimed is:

1. A game device for displaying a picture showing a first character object pulling a clothing object included in a second character object, in which the first character object and the second character object are placed in a virtual three dimensional space, comprising:
    direction obtaining means for obtaining a direction from a position of the second character object to a position of the first character object;
    clothing object control means for changing positions of at least some of vertexes of the clothing object, based on the direction obtained by the direction obtaining means; and
    first character object control means for changing a position of a predetermined portion of the first character object, based on the direction obtained by the direction obtaining means, the predetermined portion being used to pull the clothing object.

2. The game device according to claim 1, wherein
    the at least some of the vertexes of the clothing object move according to a reference point set in the virtual three dimensional space, and
    the clothing object control means changes a position of the reference point, based on the direction obtained by the direction obtaining means.

3. The game device according to claim 1 or 2, wherein
    the first character object control means changes the position of the predetermined portion, based on the positions of the at least some of the vertexes of the clothing object.

4. The game device according to claim 1 or 2, further comprising:
    distance obtaining means for obtaining a distance between the position of the second character object and the position of the first character object,
    wherein the clothing object control means changes the positions of the at least some of the vertexes of the clothing object, based on the direction obtained by the direction obtaining means and the distance obtained by the distance obtaining means.

5. The game device according to claim 4, wherein
    the clothing object control means changes the positions of the at least some of the vertexes of the clothing object, based on the direction obtained by the direction obtaining means and a distance obtained by multiplying the distance obtained by the distance obtaining means by a factor, and
    the clothing object control means includes means for changing the factor as time passes.

6. The game device according to claim 4, further comprising:
    motion data storage means for storing motion data describing a basic motion of the predetermined portion in a case where the first character object pulls the clothing object, and
    predetermined portion position obtaining means for obtaining the position of the predetermined portion of the first character object, the position being specified based on the motion data,
    wherein the distance obtaining means obtains a distance between the position of the second character object and the position of the predetermined portion of the first character object.

7. The game device according to claim 6, wherein the direction obtaining means obtains a direction from the position of the second character object to the position of the predetermined portion of the first character object.

8. A control method for controlling a game device comprising a processor for displaying a picture showing a first character object pulling a clothing object included in a second character object, in which the first character object and the second character object are placed in a virtual three dimensional space, the method comprising:
    a direction obtaining step of obtaining by the processor a direction from a position of the second character object to a position of the first character object;
    a clothing object control step of changing by the processor positions of at least some of vertexes of the clothing object, based on the direction obtained at the direction obtaining step; and
    a first character object control step of changing by the processor a position of a predetermined portion of the first character object, based on the direction obtained at the direction obtaining step, the predetermined portion being used to pull the clothing object.

9. A non-transitory computer readable information storage medium storing a program for causing a computer to function as a game device for displaying a picture showing a first character object pulling a clothing object included in a second character object, in which the first character object and the second character object are placed in a virtual three dimensional space, the program for causing the computer to function as:
    direction obtaining means for obtaining a direction from a position of the second character object to a position of the first character object;
    clothing object control means for changing positions of at least some of vertexes of the clothing object, based on the direction obtained by the direction obtaining means; and
    first character object control means for changing a position of a predetermined portion of the first character object, based on the direction obtained by the direction obtaining means, the predetermined portion being used to pull the clothing object.

* * * * *